V. P. CORBETT.

Improvement in Potato-Diggers.

No. 130,569.                    Patented Aug. 20, 1872.

Witnesses.                      Inventor:

UNITED STATES PATENT OFFICE.

VIRGIL P. CORBETT, OF ALEXANDRIA COUNTY, VIRGINIA.

IMPROVEMENT IN POTATO-DIGGERS.

Specification forming part of Letters Patent No. 130,569, dated August 20, 1872.

*To all whom it may concern:*

Be it known that I, VIRGIL P. CORBETT, of Alexandria county, State of Virginia, have invented a new and useful Improvement in Potato-Diggers and Land-Pulverizers; and I do hereby declare that the following is a full, clear, and exact description thereof, reference being had to the accompanying drawing forming a part of this specification, in which—

Figure 1:
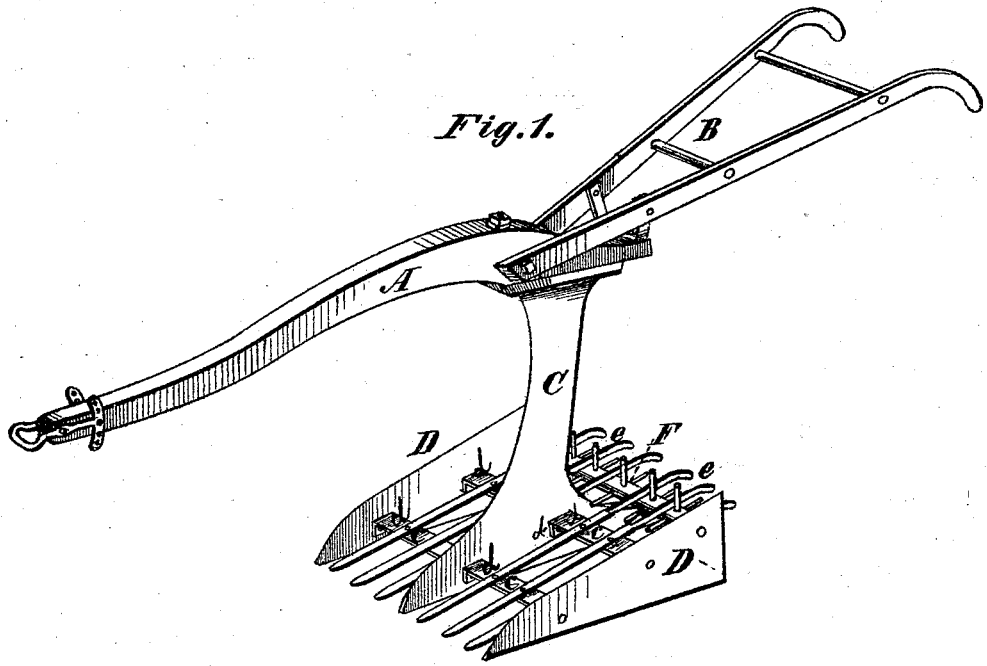
Figure 2:
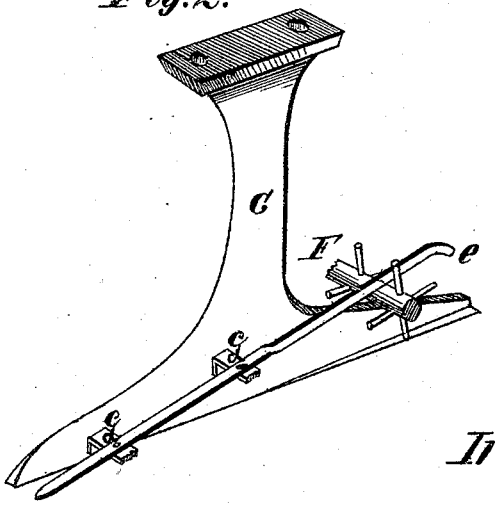

Figure 1 is a perspective view of a complete machine ready for operation, and Fig. 2 is a perspective view of the plow part thereof.

The object of my invention is to provide for use a complete and efficient potato-digger as free as possible from the usual objections, and also such as will, when used, perfectly pulverize and leave the ground in condition, without further preparation, to be seeded for another crop, such as wheat, rye, turnips, and such other seed as may be desired; and to this end my invention consists in an improvement upon my patent No. 83,833, dated November 10, 1868, the construction and combination of parts of which are hereinafter fully described.

A represents an ordinary plow-beam, and B the handles of the machine, arranged substantially as represented; and C represents a plow of the peculiar construction shown, properly secured to the beam in the most substantial manner. In this instance it is illustrated as being secured by strong bolts. The draft and depth of the machine are intended to be regulated by the clevis in the usual manner of plows and cultivators. The plow portion C is provided with a square chisel nose or point adapted to cut its way freely through the earth and under the middle of the rows of potatoes. Transversely through the strong plow C I make holes *c c*, through which are secured pieces *d d*, upon which are secured pointed fingers or supplemental plows *e e*, which are made by preference of square metal rods pointed in the manner shown, and having the form given by twisting said rods, so that one corner or edge toward the rear ends thereof may be on top the better to pulverize the earth. Upon the outer ends of the transverse bars *d d* are securely fastened the triangular wings, also pointed with a nose of the same general shape of the main plow, and substantially the same as shown in my patent of November 10, 1868. In this improved machine I also use the revolving cylinder or bar F, with its fingers or pins, and substantially in the same manner and for the same purpose as in my aforesaid patent. The cross-bars *d d* are made for convenience of construction with flanges at either end, so that the wings D D may be readily bolted thereto.

It will be observed that the pointed fingers *e e* are arranged at an inclination so as to raise the earth, and the points or noses of said fingers and that of the plow and the wings are in the same line, or nearly so.

This machine will ordinarily require, and is intended to be used with, two horses, and, the operation thereof being obvious, a particular description is deemed unnecessary.

By this construction and combination of parts the machine, when run through the ground, takes nearly or about the width of the space between the rows, and the weeds or grass between said rows are pushed aside and covered by the wings, and the angular fingers, together with the revolving bar and its fingers or pins, lift the potatoes and separate them from and leaving them all on the surface of the earth will perfectly and completely pulverize the earth and leave it level and smooth, and ready for any seed whatever. By this construction the machine may also be operated by much less power than that shown in my former patent.

Having thus fully described my invention, what I claim as new, and desire to secure by Letters Patent, is—

1. In combination with the plow C, bars *d d*, and finger-rods *e e*, the wings D, substantially as and for the purpose specified.

2. The combination, herein shown, of the plow C, rods *d d*, finger-rods *e e*, wings D D, and the revolving bar F with its fingers, whereby potatoes may be raised and separated from the earth and the earth perfectly pulverized, as set forth.

In testimony that I claim the foregoing I have hereunto set my hand.

V. P. CORBETT.

Witnesses:
   A. H. YEATMAN,
   H. BLANDY, Jr.